US011782819B2

(12) United States Patent
Levy et al.

(10) Patent No.: US 11,782,819 B2
(45) Date of Patent: Oct. 10, 2023

(54) PROGRAM EXECUTION MONITORING USING DEEP MEMORY TRACING

(71) Applicant: Microsoft Technology Licensing, LLC, Redmond, WA (US)

(72) Inventors: Nir Levy, Tel Aviv (IL); Lee Stott, Manchester (GB); Ran Gilad-Bachrach, Hogla (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 512 days.

(21) Appl. No.: 16/945,149

(22) Filed: Jul. 31, 2020

(65) Prior Publication Data

US 2022/0019513 A1    Jan. 20, 2022

Related U.S. Application Data

(60) Provisional application No. 63/052,007, filed on Jul. 15, 2020.

(51) Int. Cl.
    *G06F 11/36*    (2006.01)
(52) U.S. Cl.
    CPC .................. *G06F 11/364* (2013.01)
(58) Field of Classification Search
    None
    See application file for complete search history.

(56) References Cited

U.S. PATENT DOCUMENTS

| | | | |
|---|---|---|---|
| 6,249,882 B1* | 6/2001 | Testardi | G06F 11/3672 714/38.14 |
| 6,434,738 B1* | 8/2002 | Arnow | G06F 11/3672 717/124 |
| 6,748,584 B1 | 6/2004 | Witchsl et al. | |

(Continued)

FOREIGN PATENT DOCUMENTS

CN    103729580 A    4/2014

OTHER PUBLICATIONS

F. AlShamsi and A. Elnagar, "An automated assessment and reporting tool for introductory Java programs," 2011 International Conference on Innovations in Information Technology, 2011, pp. 324-329, doi: 10.1109/INNOVATIONS.2011.5893842. (Year: 2011).*

(Continued)

*Primary Examiner* — Andrew M. Lyons
(74) *Attorney, Agent, or Firm* — Christopher J. Volkmann; Kelly, Holt & Christenson, PLLC

(57) ABSTRACT

A user-annotated reference implementation identifies variable values generated by the reference implementation during its execution. A software implementation under analysis is executed. Variable values in the running memory of the program code of the software implementation under analysis, during its execution, are identified and copied. The variable values traced from the running memory of the program code are compared against the annotated variable values generated by the reference implementation, to determine a similarity between the program code under analysis, and the reference implementation. An output is generated that is indicative of whether the traced variables from the program code under analysis are the same as the annotated variable values generated by the reference implementation.

20 Claims, 14 Drawing Sheets

(56) References Cited

U.S. PATENT DOCUMENTS

| | | | | |
|---|---|---|---|---|
| 8,021,221 | B2* | 9/2011 | Lydon | G06Q 10/06398 |
| | | | | 463/40 |
| 8,261,237 | B2 | 9/2012 | Zeidman | |
| 8,353,056 | B2 | 1/2013 | Han | |
| 9,207,915 | B2 | 12/2015 | Asaduilah et al. | |
| 2009/0286218 | A1* | 11/2009 | Johnson | G09B 7/02 |
| | | | | 434/353 |
| 2010/0100774 | A1* | 4/2010 | Ding | G06F 11/3636 |
| | | | | 714/E11.029 |
| 2010/0242023 | A1* | 9/2010 | Han | G06F 21/12 |
| | | | | 717/124 |
| 2010/0287539 | A1* | 11/2010 | Park | G06F 11/3636 |
| | | | | 717/130 |
| 2011/0289482 | A1* | 11/2011 | Bentley | G06F 11/3419 |
| | | | | 717/125 |
| 2012/0101929 | A1 | 4/2012 | Howard et al. | |
| 2013/0219374 | A1* | 8/2013 | Jain | G06F 8/30 |
| | | | | 717/131 |
| 2015/0039541 | A1* | 2/2015 | Kapur | G06N 20/00 |
| | | | | 706/12 |
| 2015/0227364 | A1* | 8/2015 | Asadullah | G06F 8/751 |
| | | | | 717/120 |
| 2017/0249231 | A1* | 8/2017 | Bofferding | G06F 11/3604 |
| 2018/0129597 | A1* | 5/2018 | Anaya | G06F 11/3692 |
| 2020/0334021 | A1* | 10/2020 | Bucuvalas | G06F 8/427 |

OTHER PUBLICATIONS

X. Liu, S. Wang, P. Wang and D. Wu, "Automatic Grading of Programming Assignments: An Approach Based on Formal Semantics ," 2019 IEEE/ACM 41st International Conference on Software Engineering: Software Engineering Education and Training (ICSE-SEET),2019, pp. 126-137, doi: 10.1109/ICSE-SEET.2019.00022. (Year: 2019).*

S. Zougari, M. Tanana and A. Lyhyaoui, "Hybrid assessment method for programming assignments," 2016 4th IEEE International Colloquium on Information Science and Technology (CiSt), 2016, pp. 564-569, doi: 10.1109/CIST.2016.7805112. (Year: 2016).*

G. Robles and J. M. Gonzalez-Barahona, "Mining student repositories to gain learning analytics. An experience report," 2013 IEEE Global Engineering Education Conference (EDUCON), 2013, pp. 1249-1254, doi: 10.1109/EduCon.2013.6530267. (Year: 2013).*

E. Stankov, M. Jovanov, B. Kostadinov and A. Madevska Bogdanova, "A new model for collaborative learning of programming using source code similarity detection," 2015 IEEE Global Engineering Education Conference (EDUCON), 2015, pp. 709-715, doi: 10.1109/EDUCON.2015.7096047. (Year: 2015).*

Xiaohong Su, Jing Qiu, Tiantian Wang and Lingling Zhao, "Optimization and improvements of a Moodie-Based online learning system for C programming," 2016 IEEE Frontiers in Education Conference (FIE), 2016, pp. 1-8, doi: 10.1109/FIE.2016.7757699. (Year: 2016).*

"Automate Grading & Personalize Feedback", Retrieved from: https://okpy.org/, Retrieved Date: Jan. 7, 2020, 4 pages.

"Get help with GitHub Classroom", Retrieved from: https://classroom.github.com/help/auto-grading, Retrieved Date: Jan. 7, 2020, 1 Page.

"Otter-Grader Documentation", Retrieved from: https://otter-grader.readthedecs.io/en/latest/, Retrieved Date: Jan. 7, 2020, 1 Page.

"Simplify Teaching", Retrieved from: http://www.autolabproject.com/, Retrieved Date: Jan. 7, 2020, 9 Pages.

Corbett et al., "Locus of Feedback Control in Computer-Based Tutonng Impact on Learning Rate, Achievement and Attitudes", In Proceedings of the SIGCHI conference on Human factors in computing: systems, Mar. 31, 2001, pp. 245-252.

Goldstein, et al. "Understanding How Work Habits Influence Student Performance", In Proceedings of the ACM Conference on Innovation and Technology in Computer Science Education, Jul. 15, 2019, pp. 154-160.

Gupta, et al., "Source Code Plagiarism Detection using Multi Layered Approach for C Language Programs", In International Journal of Computer Applications, vol. 105. No. 12, Nov. 2014, pp. 5-11.

Jhi, et al., "Value-Based Program Characterization and its Application to Software Plagiarism Deteotion", In Proceedings of the 33rd International Conference on Software Engineering, May 21, 2011, pp. 756-765.

Skalka, et al., "Automated Assessment in Learning and Teaching Programming Languages using Virtual Learning Environment", In Proceedings of IEEE Global Engineering Education Conference, Apr. 8, 2019, 10 Pages.

"Tracing (software)", Retrieved from: https://en.wikipedia.org/wiki/Tracing_(software), Apr. 14, 2016, 4 Pages.

"International Search Report and Written Opinion Issued in PCT Application No. PCT/US21/029255", dated Aug. 16, 2021, 11 Pages.

* cited by examiner

Instructions

For a vector $v = (v_1, \ldots, v_k)$ the goal of this task is to compute $w = (w_1, \ldots, w_k)$ such that
$$w_i = \prod_{j \neq i} v_j$$

You will receive the vector $v$ as a CSV file named v.csv

Your result should be rounded to 3 decimal digits reference implementation

```
In [ ]: # import numpy as np
        import pandas as pd

In [ ]: # data = pd.read_csv('v.csv')
        v = data['v'].to_numpy()

product = v.prod()
        w = np.round([product/x for x in v], 3)

print(w)
```

FIG. 3

IMPLEMENTATION UNDER ANALYSIS

```
import numpy as np
import pandas as pd
```

```
data = pd.read_csv('v.csv')
v = data['v'].to_numpy()

t = 1
for i in range(0, len(v)):
    t = t * v[i]

res = []
for i in range(0, len(v)):
    res.append(t / v[i])
res = np.round(res, 3)
print(res)
```

```
In [1]:  import tester

In [2]:  import numpy as np
         import pandas as pd

In [3]:  data = pd.read_csv('v.csv')
         v = data['v'].to_numpy()
         t = 1
         for i in range(0, len(v)):
             t = t * v[i]
         res = []
         for i in range(0, len(v)):
             res.append(t / v[i])
         res = np.round(res, 3)
         print(res)

[-243. -445.0 -243.  720. -887.5 -486.  -81. ]

In [4]:  tester.done(['3 decoration'],0)

running test 3 decoration
         >>> testing student code
         found value  0
         found value  prod
         found value  x
         no errors were found Out[4]: 0
```

FIG. 7

IMPLEMENTATION UNDER ANALYSIS

```
In [ ]: ▶ import numpy as np
           import pandas as pd

In [ ]: ▶ data = pd.read_csv("v.csv")
           v = data['v'].to_numpy()
           prefix = [1]
           t = 1
           for i in range(0, len(v)-1):
               t = t * v[i]
               prefix.append(t)
           suffix = [1]
           t = 1
           for i in range(0, len(v)-1):
               t = t * v[-1 - i - 1]
               suffix.append(t)
           res = []
           for i in range(0, len(v)):
               res.append(prefix[i] * suffix[len(v) - i - 1])
           w = np.round(res, 3)
           print(w)
```

PROGRAM EXECUTION MONITORING USING DEEP MEMORY TRACING

CROSS-REFERENCE TO RELATED APPLICATION

The present application is based on and claims the benefit of U.S. provisional patent application Ser. No. 63/052,007, filed Jul. 15, 2020, the content of which is hereby incorporated by reference in its entirety.

BACKGROUND

Computer systems are currently in wide use many computer systems are used in the development of computer software and in the monitoring and evaluation of that software, during development.

There are a variety of different scenarios where it can be desirable to monitor the execution of program code that is used in a software implementation. For instance, in the academic environment, a user may submit program code for assessment and grading. In such an environment, another person (such as a teaching assistant or professor) must assess whether the program code that is submitted operates, like a reference implementation, to obtain a desired result. Similarly, in various business environments, it may be desirable to monitor the execution of program code to determine whether the program code was surreptitiously obtained (e.g., copied) by another user. It can be difficult to identify such characteristics of program code during its execution.

The discussion above is merely provided for general background information and is not intended to be used as an aid in determining the scope of the claimed subject matter.

SUMMARY

A user-annotated reference implementation identifies variable values generated by the reference implementation during its execution. A software implementation under analysis is executed. Variable values in the running memory of the program code of the software implementation under analysis, during its execution, are identified and copied. The variable values traced from the running memory of the program code are compared against the annotated variable values generated by the reference implementation, to determine a similarity between the program code under analysis, and the reference implementation. An output is generated that is indicative of whether the traced variables from the program code under analysis are the same as the annotated variable values generated by the reference implementation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3 shows one example of a reference implementation.

FIG. 6 shows one example of a software implementation under analysis.

FIG. 7 shows an output that can be based on tracing the execution of the implementation illustrated in FIG. 6.

FIG. 8 illustrates a second software implementation under analysis.

FIG. 9 shows an output generated based on monitoring or tracing the software implementation shown in FIG. 8, during execution.

FIG. 10 shows one example of user inputs annotating the software illustrated in FIG. 8, to convert it into an additional reference implementation.

DETAILED DESCRIPTION

Figure 1:
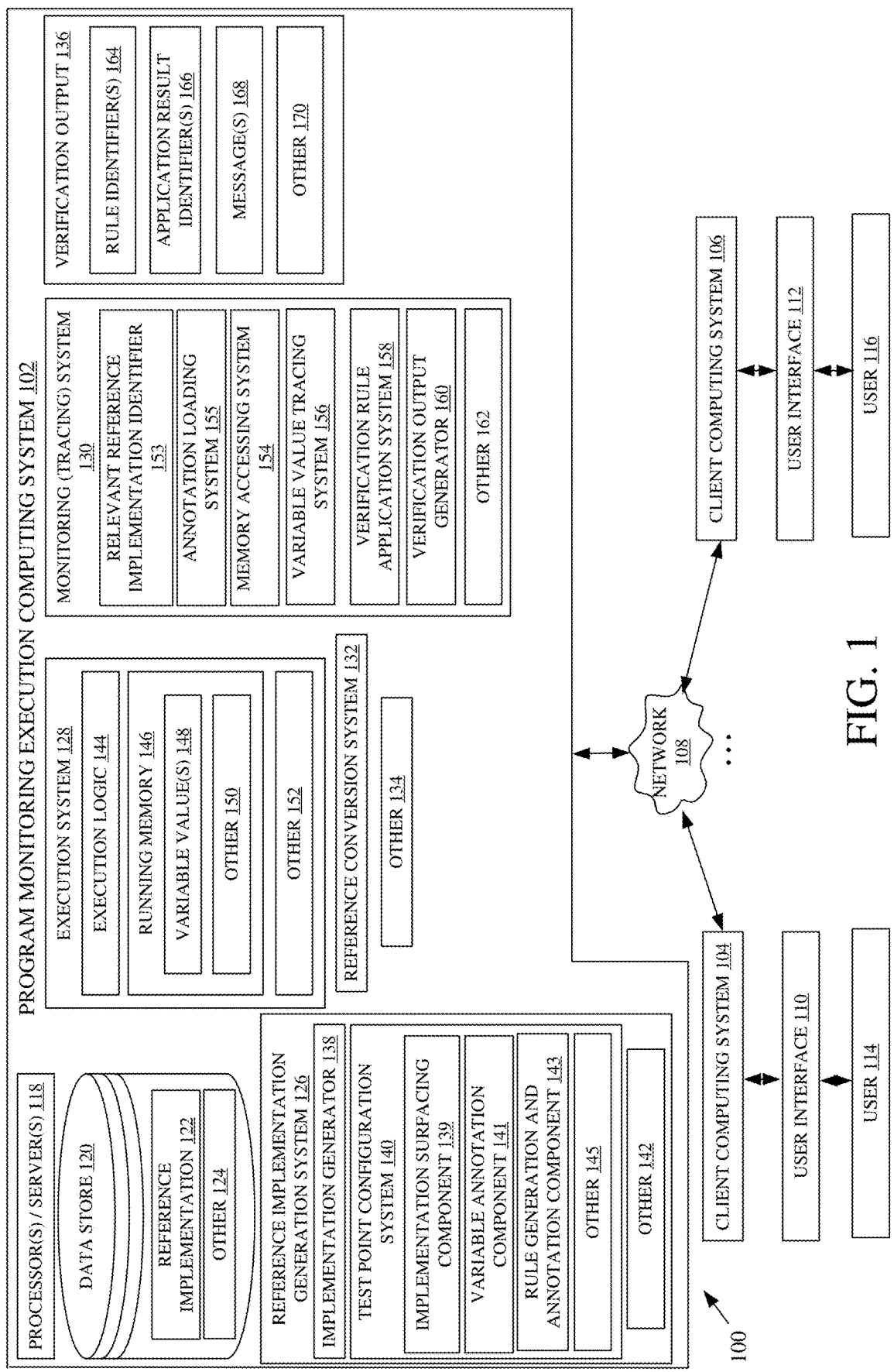
FIG. 1 is a block diagram of one example of a computing system architecture in which program execution monitoring or tracing is performed.

As discussed above, there are many scenarios where it is desirable to determine whether a source code implementation corresponds to a reference source code implementation. For instance, in the academic environment, it may be that a professor has provided students with a problem that is to be solved using a software implementation. The professor then may have hundreds or thousands of students submitting proposed implementations, and those proposed implementations are to be assessed and graded. In order to enhance the efficiency in assessment and grading, some current systems are built on a case-by-case basis focusing on a single unit test. That is, they are automated tools that may assess a single, pre-defined, unit test but are inflexible so that they are not used for assessing other tests or newly defined tests. In addition, these types of current systems normally provide a pass/fail output. That is, they look at the output of the source code implementation under analysis to determine whether it is correct and, if so, provide an output indicating that the source code implementation passed. If not, they provide an output indicating that the source code implementation failed.

Another scenario where it is desired to determine whether a source code implementation under analysis conforms to a reference source code implementation is in determining whether a piece of code has been misappropriated through some type of surreptitious action. Again, some current tools simply monitor what is provided to the source code implementation and what is received from the source code implementation to see if the results are the same. Other tools examine the source code, itself, but these tools do not identify a source code implementation which was slightly modified (e.g., the variable names were changed).

Still other systems automatically extract common strings from memory by two different implementations and compare them. However, in these systems, there is no way for a user to annotate a reference implementation to select which variable values are important in determining similarity of the two implementations.

The present discussion thus proceeds with respect to obtaining a reference source code implementation and surfacing it so that variable values of interest can be annotated by a user. The reference implementation is then executed and a deep memory analysis is performed on that implementation by tracing the annotated variable values (as opposed to variable names) and copying intermediate values that will appear in another source code implementation if it is the same as the reference source code implementation. The present discussion thus compares the memory space of the running memory of a source code implementation under analysis to the memory space of the reference source code implementation to determine whether user-annotated variables (or test points) are the same. This determination is used to determine whether the two implementations correspond to one another (e.g., whether they are basically the same implementation). The present description thus allows a user to annotate the reference source code implementation to identify values that should or should not appear in the source code implementation under analysis. Those values are then compared to the values in the running memory of the source code implementation under analysis to determine whether they do or do not appear.

Also, it will be noted that the present description proceeds with respect to defining both positive reference source code implementations and negative reference source code implementations. So, for instance, a professor may annotate a positive reference source code implementation which is an implementation that successfully generates the correct answer to a problem. If a student's source code implementation corresponds to a positive reference source code implementation, then the student has provided an acceptable implementation. The professor may also annotate negative reference source code implementations which represent source code implementations that contain common mistakes that are often submitted by students. If a source code implementation that is submitted by a student matches one of the negative reference source code implementations, then the present description describes a system which outputs rich results describing the errors that the student made, thus greatly enhancing feedback.

Also, the present description proceeds with respect to a system that allows a user to quickly convert an implementation under analysis into an additional reference implementation. The present system generates a user interface that allows the user to easily annotate the implementation under analysis and save it as an additional reference implementation.

FIG. 1 is a block diagram of one example of a computing system architecture 100. Architecture 100 can be deployed in a variety of different contexts using different infrastructures. It can be in an on-prem deployment, a cloud-based deployment, or a hybrid or other deployment. Architecture 100 shows a program execution monitoring (tracing) system 102 that can be accessed by a plurality of different client computing systems 104-106 over a network 108. Therefore, network 108 may be a wide area network, a local area network, a near field communication network, a cellular communication network, or any of a wide variety of other networks or combinations of networks.

In one example, client computing systems 104-106 generate user interfaces 110-112, respectively, which users 114 and 116 can interact with. User 114 illustratively interacts with user interface 110 in order to control and manipulate client computing system 104 and some portions of program execution monitoring (tracing) system 102. Similarly, user 116 can interact with user interface 112 in order to control and manipulate client computing system 106 and some portions of program execution monitoring (tracing) system 102.

Thus, user 114 may generate and annotate a reference source code implementation and submit it to program execution monitoring system 102. User 116 may then generate a source code implementation that is to be analyzed (an implementation under analysis) and provide it to system 102 as well. System 102 can then illustratively run the reference source code implementation and the source code implementation under analysis and compare the running memory space of both implementations to determine whether the source code implementation under analysis conforms to the reference source code implementation. Thus, in the academic scenario, user 114 may be a professor who generates and annotates a reference source code implementation and user 116 may be a student that submits a source code implementation under analysis for assessment and grading. System 102 determines whether the student's source code implementation is the same as that submitted by the professor.

In other scenarios, it may be that user 114 provides a reference source code implementation that user 114 believes may have been surreptitiously obtained (or misappropriated) by another user. The surreptitious user's source code implementation can be run by system 102 and the memory space of that implementation can be compared to the reference source code implementation to see whether the two implementations are the same. Other scenarios are contemplated herein as well, where the deep memory space of an annotated reference source code implementation is compared against the deep memory space of a source code implementation under analysis to see whether the two are the same.

Before describing the overall operation of architecture 100 in more detail, a brief description of some of the items in architecture 100, and their operation, will first be provided.

Program execution monitoring system 102 illustratively includes one or more processors or servers 118, a data store 120 (which can store reference implementations 122 and other items 124), reference implementation generation system 126, execution system 128, monitoring (tracing) system 130, reference conversion system 132, and it can include other items 134. Monitoring (tracing) system 130 can also generate a verification output 136 which can be surfaced to one or more users and which indicates whether a source code implementation under analysis conforms to one of the reference implementations 122.

Reference implementation generation system 126 includes an implementation generator 138, a test point configuration system 140 (which, itself, includes implementation surfacing component 139, variable annotation component 141, rule generation and annotation component 143 and other items 145), and it can include other items 142. Implementation generator 138 can be a development environment which allows user 114 to generate a reference implementation. Test point configuration system 140 illustratively allows user 114 to configure various test points within the reference implementation. Implementation surfacing component 139 surfaces the reference implementation in a user interface that makes it easy for a user to annotate the reference implementation in order to configure the test points. Variable annotation component 141 allows the user to annotate, as variables to be traced, initial variable values, and intermediate and final variable values, that will appear in the running memory of an implementation under analysis, if that implementation under analysis conforms to the reference implementation. Rule generation and annotation component 143 allows the user to generate rules and annotate the reference implementation with those rules. The rules may include, for instance, rules that apply logical operators, input values, output values, among other things. This is described in greater detail below. Reference implementation generation system 126 thus outputs an annotated (or decorated) reference implementation 122 against which implementations under analysis can be compared to determine their correspondence.

Execution system 128 illustratively includes execution logic 144, and running memory 146 (which will contain initial, intermediate, and final variable values 148 that occur when execution logic 144 executes a software implementation). Running memory 146 can include other items 150 as well. In addition, execution system 128 can also include other items 152. Thus, execution system 128 provides an execution environment where reference implementations 122 and implementations under analysis can be executed.

Monitoring (tracing) system 130 illustratively traces the running memory 146 of the implementations executed in execution system 128. Thus, monitoring or tracing system 130 illustratively includes relevant reference implementation identifier 153, test point loading system 155, running memory accessing system 154, variable tracing system 156, verification rule application system 158, verification output generator 160, and it can include other items 162. When a decorated reference implementation is executed by system 128, running memory accessing system 154 accesses the running memory 156 of execution system 128, as it is executing the reference implementation. Test point loading system 155 identifies the variables which were marked as test points (or annotated variable values) in the reference implementation. System 156 traces the value of those variables 148 in running memory 146, as the reference implementation is executed. Verification rule application system 158 also executes any rules (which may, for instance, contain logical operators) on the variable values 148 as the reference implementation is running. Once the reference implementation is traced by system 130, verification output generator 160 illustratively generates a verification output 136 which includes a rule identifier 164 that identifies the rules in the reference application, an application result identifier 166 which identifies the results of applying those rules during execution of the reference application, and messages 168 which may be generated by the rules as they are executed. Verification output 136 can include other items 170 as well. Thus, the variable values and other test point values generated by the reference implementation are now known and can be saved along with the reference implementation.

Then, when an implementation under analysis is provided to system 102, execution logic 144 executes the implementation under analysis, and running memory 146 stores the variable values 148 that are obtained while the implementation under analysis is executed. Monitoring (or tracing) system 130 traces the values in the running memory 146 during execution, of the implementation under analysis.

Thus, running memory accessing system 154 accesses the running memory 146 during execution, and variable value tracing system 156 traces the variable values 148 during execution of the implementation under analysis. Verification rule application system 158 applies the rules, that are identified as test points in the reference implementation, to the values generated by the implementation under analysis and outputs results of applying those rules. Verification output generator 160 then generates a verification output 136 indicative of the results of running the implementation under analysis. In that case, the rule identifier 164 identifies the rules that were applied (such as whether expected variable values were generated by the implementation under analysis). Application result identifier 166 identifies the results of applying those rules (e.g., whether the variables expected in the implementation under analysis were actually found in running memory 146 or not, and whether the result of applying any logical rules to the values in the running memory 146 are the same as the results generated by applying those rules to the values in the running memory generated by the reference implementation). Messages 168 provide an output indicating either that the implementation under analysis is the same (or corresponds to) the reference implementation, or that it does not. In the latter case, the messages illustratively describe why the implementation under analysis is not the same as the reference implementation.

Figure 2:
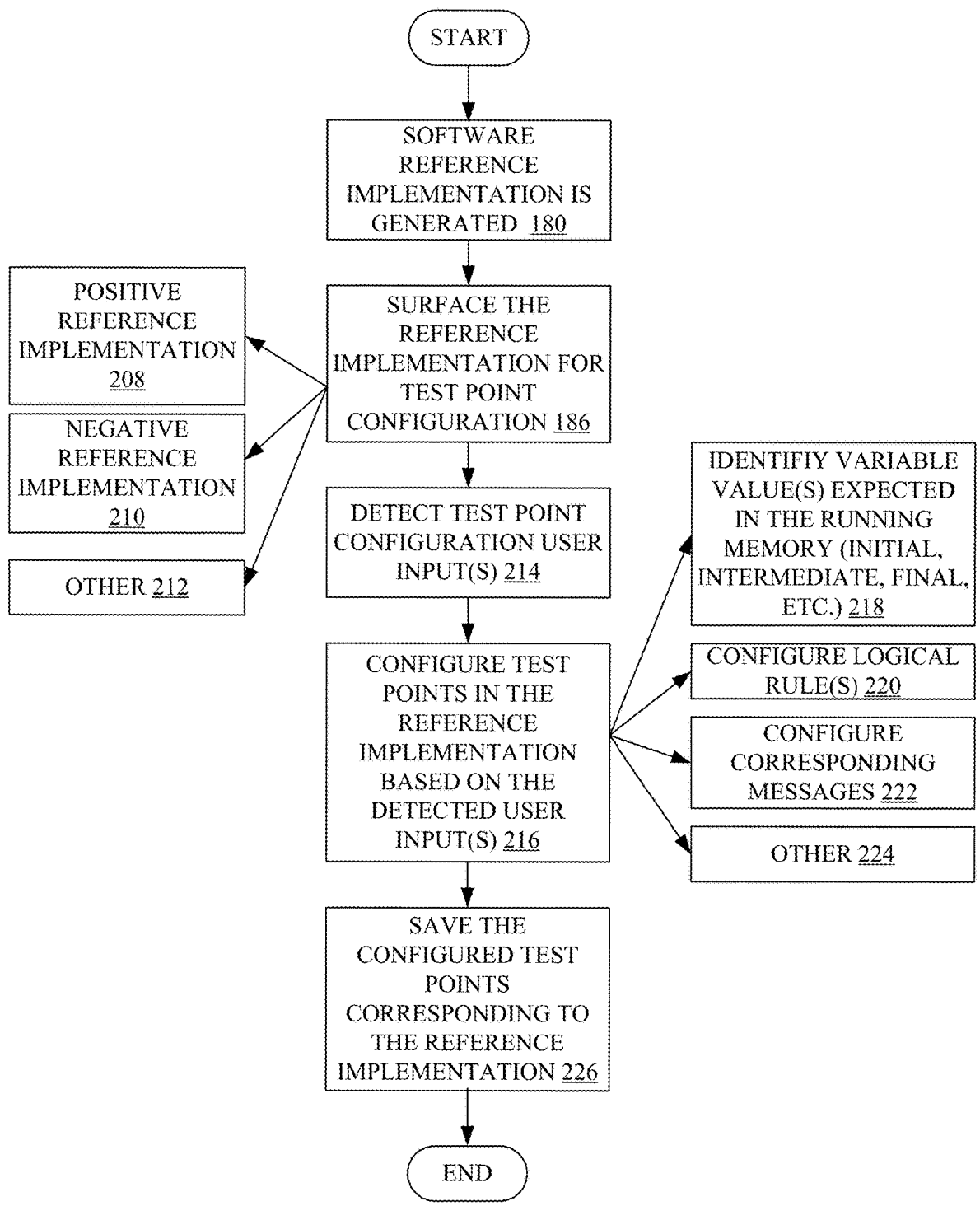
FIG. 2 is a flow diagram illustrating one example of the operation of the architecture illustrated in FIG. 1 in allowing user annotation of a reference implementation to configure test points in the reference implementation.
Figure 4:
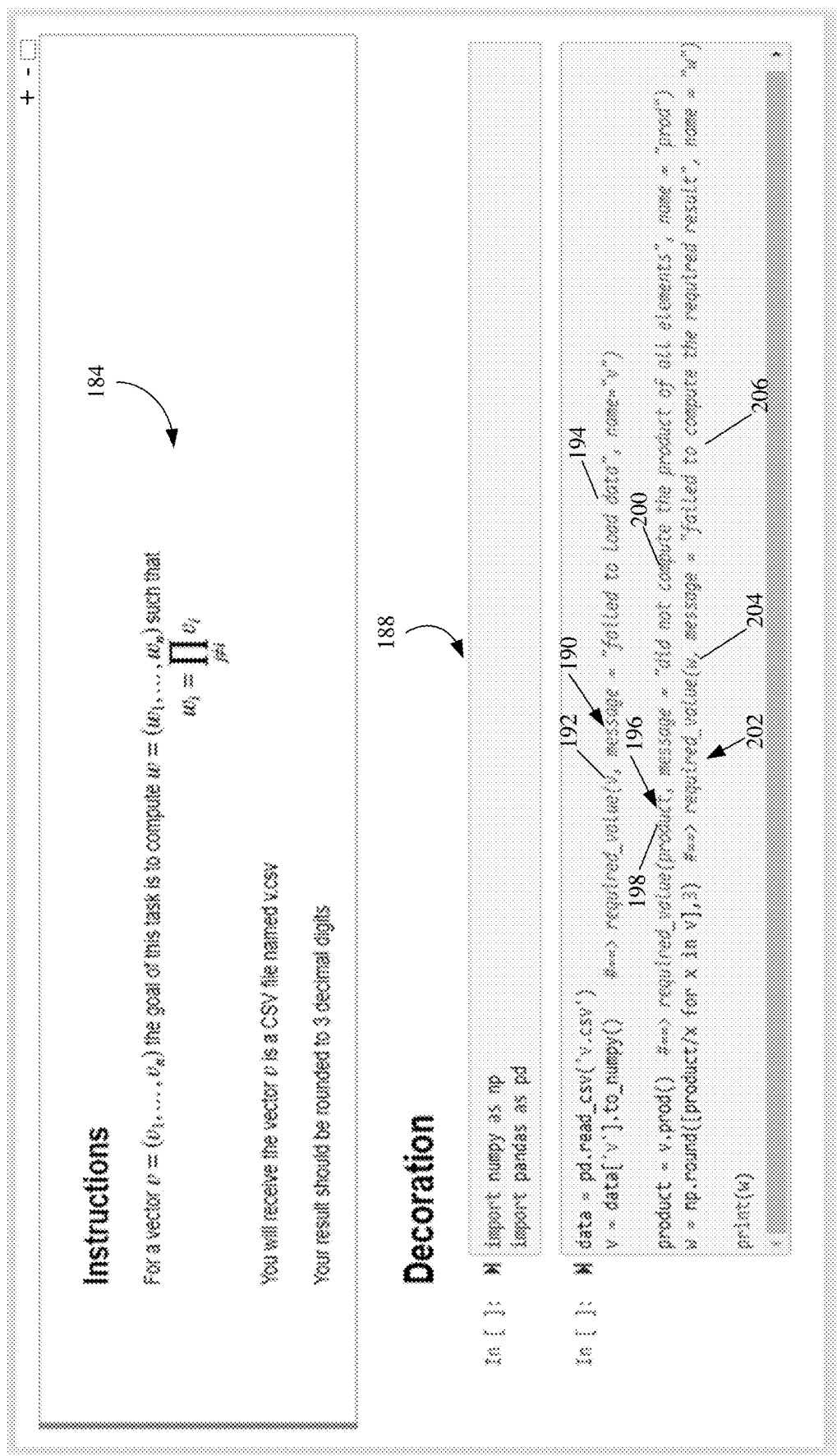
FIG. 4 shows an example in which user annotations are detected to configure test points in the reference implementation illustrated in FIG. 3.

FIG. 2 is a flow diagram illustrating one example of the operation of test point configuration system 140 in reference implementation generation system 126. System 140 allows a user 114 to annotate or decorate a reference implementation. Test point configuration system 140 thus allows a user to identify important variable values that will occur in the running memory generated by the reference implementation. It also allows the user to annotate those variable values to indicate whether they should or should not appear in a reference implementation under analysis. System 140 also allows the user to define functions or rules that are to be applied. FIGS. 3 and 4 show user interfaces that can be generated to allow a user to annotate a reference implementation. FIGS. 2-4 will now be described in conjunction with one another.

It is first assumed that a software reference implementation has been generated by a user (for example user 114). This is indicated by block 180 in the flow diagram of FIG. 2. FIG. 3 shows an example in which a reference implementation 182 is generated to solve a problem indicated at 184. The reference implementation 182 solves the problem 184 in an expected way. As one example, the problem 184 may be assigned by a professor (user 114) and the professor may also generate a solution (reference implementation 182) against which student implementations, can be compared or assessed.

Test point configuration system 140 can be used for test point configuration in a variety of different ways. In one example, test point configuration system 140 surfaces the reference implementation 182 so that user 114 can perform test point configuration within reference implementation 182. This is indicated by block 186 in the flow diagram of FIG. 2. In order to configure test points, in such an example, user 114 illustratively marks pieces of the reference implementation 182 that are important. Thus, implementation surfacing component 139 can surface reference implementation 182 in a user interface that allows user 114 to easily annotate it. Variable annotation component 141 allows user 114 to mark variable values that will appear in the running memory when reference implementation 182 is executed.

Rule generation and annotation component 143 allows user 114 to define more complex rules that may be applied and to annotate the reference implementation with those rules.

FIG. 4 shows an example in which reference implementation 182 has now been annotated or decorated to obtain an annotated or decorated reference implementation 188. It can be seen that user 114 has identified the loading step in which the reference implementation reads the input vector v as being required. That is, user 114 has indicated that some vector (although it need not be named "v") is required in the running memory, and must have the values found in the input vector that is to be read into the reference implementation. This is indicated by annotation 190 in annotated reference implementation 188. Specifically, annotation 190 shows that the running memory must contain a variable value that has the values in the vector v. This is indicated by 192 in annotation 190. If it does not, then a message 194 is generated, and in this case the message is "Failed to load data".

FIG. 4 also shows that user 114 has provided an annotation 196 which indicates that a required value will be the product of all values in the input vector. The required value is denoted as the product 198 in annotation 196. If the implementation under analysis does not compute the product of all values in the input vector, then the message 200 is displayed. In this case, the message is "Did not compute the product of all elements".

FIG. 4 also shows that user 114 has identified, as a required value, the output or result generated by the reference implementation. This is indicated by annotation 202. It can be seen that the result is indicated at 204 and, if the result of an implementation under analysis does not output the correct result, then message 206 is displayed. In this case, the message is "Failed to compute the required result."

It will be noted that the above discussion has proceeded with respect to the test points being manually configured through annotation or decoration. Other configuration mechanisms can be used as well. For instance, component 139 can parse the code and automatically identify certain portions that are recommended as test points. Automatically identifying and recommending test points can be done based on a wide variety of different criteria, such as identifying intermediate variable values, output results, the particular code functions being used, etc. The automated suggestion can include suggested messages as well. The automated suggestion of test points can also be initiated automatically or invoked by the user, such as by using a context menu (by right clicking using a point and click device), or in other ways. The present description now continues with respect to the example in which test points are configured through annotation or decoration, although this is just one example and those mentioned above, and others, are contemplated herein.

Thus, once the test points are configured in this way, then when an implementation under analysis is executed, monitoring (tracing) system 130 monitors the deep memory space generated in the running memory to determine whether a vector appears with a value v (192 in FIG. 4), and whether an accurate product value appears (represented by 198 in FIG. 4) appears in the running memory, and also whether a result value w (204 in FIG. 4) in the running memory. It will be noted that the present system looks for the values of the variables, and not the variable names themselves. Therefore, even if the variables names are changed, so long as the variable values appear in the running memory, the implementation under analysis can be identified as corresponding to the reference implementation.

Returning again to FIG. 2, it will also be noted that user 114 can annotate or configure target points in positive reference implementations 208 as well as negative reference implementations 210 (as discussed above). A reference implementation can be surfaced for target test point configuration in other ways as well, and this is indicated by block 212. Detecting test point configuration user inputs identifying the important pieces of a reference implementation is indicated by block 214 in FIG. 2.

Test point configuration system 140 then configures the test points in the reference implementation based upon the detected user inputs. This is indicated by block 216. As mentioned above, the configuration may identify variable values (initial, intermediate, and final values, etc.) expected in the running memory of an implementation under analysis. This is indicated by block 218. The test points may also include logical rules which test point configuration system 140 configures to be executed by tracing system 130. This is indicated by block 220. The configured test points also illustratively include corresponding messages as indicated by block 222. The test point configuration can include other items 224 as well.

Test point configuration system 140 then saves the configured test points (annotations) corresponding to the reference implementation. In one example, it saves the annotations along with the reference implementation 122 in data store 120. Saving the configured test points (annotations) corresponding to the reference implementation is indicated by block 226 in the flow diagram of FIG. 2.

Figure 5A:
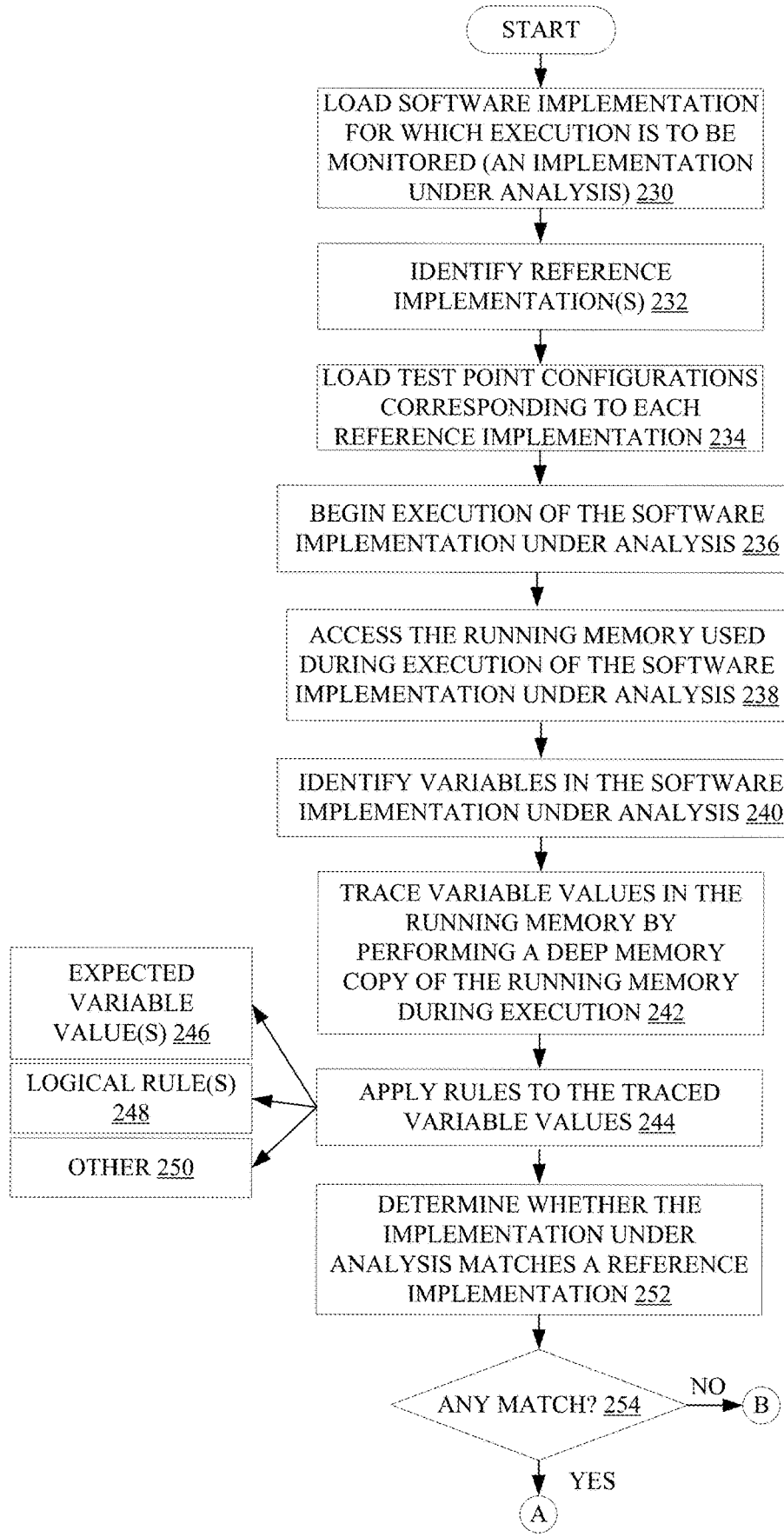
FIGS. 5A and 5B (collectively referred to herein as FIG. 5) show a flow diagram illustrating one example of the operation of the architecture illustrated in FIG. 1 in monitoring or tracing memory values in a running memory of a software implementation under analysis and generating an output indicative of the tracing.
Figure 5B:
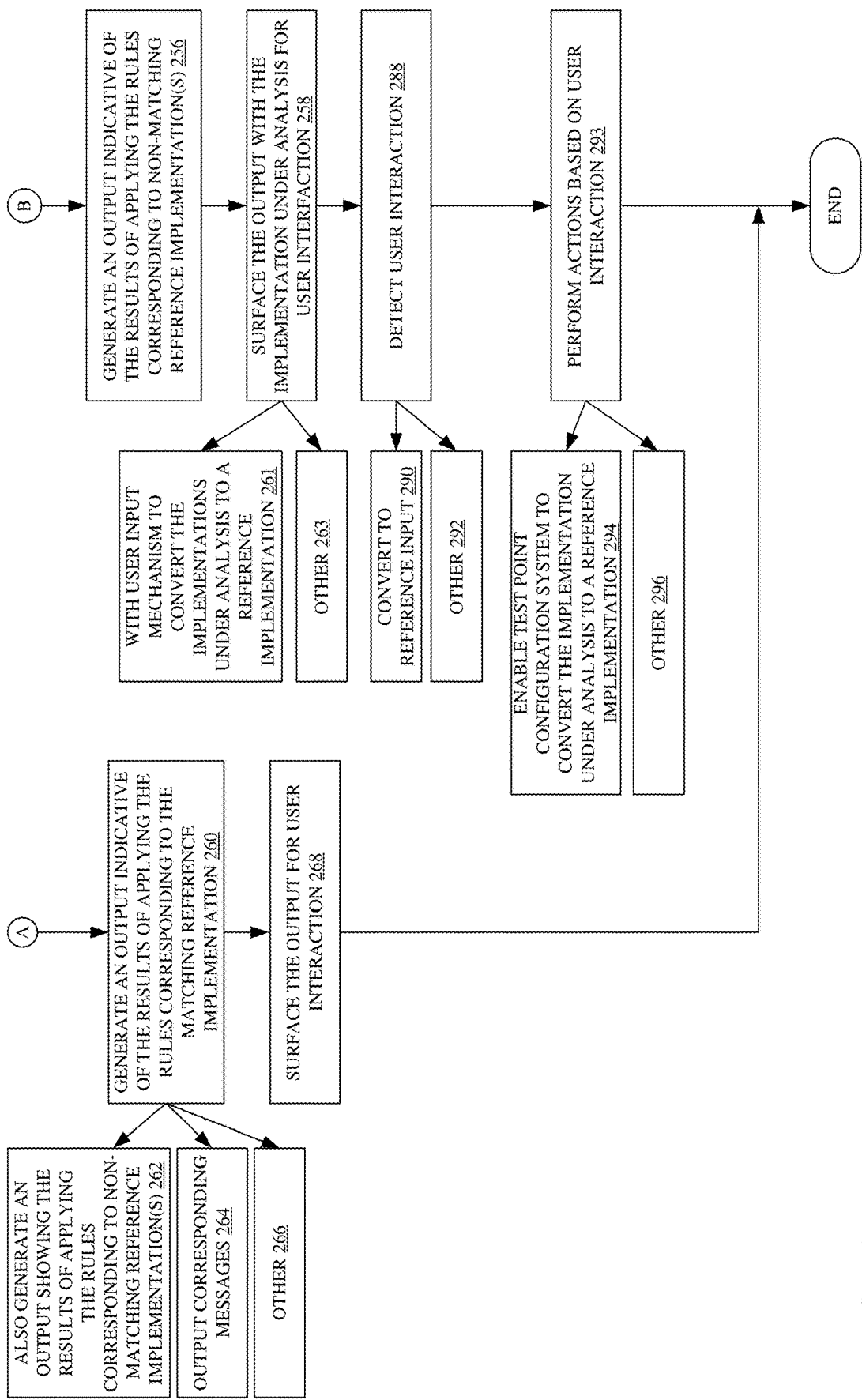

FIGS. 5A and 5B (collectively referred to herein as FIG. 5) show a flow diagram illustrating one example of the operation of program execution monitoring system 102 in tracing the memory during execution of an implementation under analysis and generating an output result based on the memory tracing. It is first assumed that a software implementation for which execution is to be monitored (an implementation under analysis) has been generated and loaded into execution system 128. This is indicated by block 230 in the flow diagram of FIG. 5.

Relevant reference implementation identifier 153 then identifies any reference implementations 122 against which the implementation under analysis is to be compared or assessed. For instance, data store 120 may contain a wide variety of different reference implementations, where the implementation under analysis is to be compared against only a subset of them. Thus, reference implementation identifier 153 identifies those particular reference implementations that are to be compared to the implementation under analysis. Identifying the reference implementations is indicated by block 232 in the flow diagram of FIG. 5.

Test point loading system 155 then loads the test points (e.g., variable values, logical rules and rule values, etc.) corresponding to each of relevant reference implementations that were identified by reference implementation identifier 153. Loading the test point configurations is indicated by block 234 in the flow diagram of FIG. 5. Execution logic 144 then begins executing the software implementation under analysis. This is indicated by block 236.

Monitoring system 130 then begins monitoring the running memory 146 as the implementation under analysis is being executed. Running memory accessing system 154 thus accesses running memory 146 and variable value tracing system 156 identifies variable values 148 in running memory 146 and traces those values by performing a deep memory copy of the running memory 146 during execution of the implementation under analysis. Accessing the running memory during execution of the implementation under analysis is indicated by block 238 in the flow diagram of FIG. 5. Identifying the variables used by the implementations under analysis is indicated by block 240 and tracing the variable values 148 in the running memory 146 by performing a deep memory copy of memory 146 is indicated by block 242 in the flow diagram of FIG. 5. In one example, a copy of running memory 146 is obtained each time a variable value 148 changes. The deep copy of running memory 146 can be performed in other ways as well.

Once the implementation under analysis has been executed, then verification rule application system 158 applies any rules in the test points against the variable values identified and traced during execution of the implementation under analysis. This is indicated by block 244 in the flow diagram of FIG. 5. As discussed above, the rules are defined in the annotations or decorations applied by the user. A rule may be as simple as indicating that a certain variable value is required. The rules may be more complex as well, such as rules that apply functions or logical operators to the valuable values. For instance, verification rule application system 158 may first determine whether the variable values that are expected (or required) in the implementation under analysis actually appeared in the running memory 146 during execution of that implementation. This is indicated by block 246 in the flow diagram of FIG. 5. System 158 may also determine whether the results of applying any logical rules are the same in running memory 146 as those generated by the reference implementation. This is indicated by block 248 in the flow diagram of FIG. 5. System 158 can determine whether other values show up in running memory 146 or whether other required characteristics or attributes of the values in running memory 146 are present as well. This is indicated by block 250 in the flow diagram of FIG. 5.

Based upon the values that appear in running memory 146, system 158 then determines whether the implementation under analysis matches (or corresponds to) any of the reference implementations identified at step 232. This is indicated by block 252 in the flow diagram of FIG. 5.

If, at block 254, it is found that one of the reference implementations corresponds to (or matches) the implementation under analysis, then verification output generator 160 generates an output indicative of the results of applying the rules corresponding to the matching reference implementation. This is indicated by block 260 in the flow diagram of FIG. 5. Where the implementation under analysis is compared to more than one reference implementation, then the output generator 160 can also generate an output showing the results of applying the rules corresponding to any non-matching reference implementations as well. This is indicated by block 262. The messages in the reference implementations can be surfaced, along with other items. This is indicated by blocks 264 and 266 in the flow diagram of FIG. 5. Once the verification output 136 has been generated, it can be surfaced for user interaction. This is indicated by block 268. An example of processing an implementation under analysis may be helpful.

FIG. 6 shows one example of an implementation under analysis 270. It can be seen that implementation 270 is different from reference implementation 182, but that it will yield the same result. Therefore, assume that implementation under analysis 270 is loaded into execution system 128 and execution logic 144 begins to execute it. Assume also that relevant reference implementation identifier 153 identifies reference implementation 182 and its corresponding annotations (e.g., test points, values, logical rules, etc.). Then, during execution of implementation under analysis 270, running memory accessing system 154 accesses the running memory 146 so that variable value tracing system 156 and verification rule application system 158 can trace the variable values 148 and execute any logical rules on them, based upon the annotations loaded by test point loading system 155.

FIG. 7 shows that the result 272 of executing the implementation 270 is displayed. In addition, the verification output 136 corresponding to the comparison between the variable values generated in running memory 146 during execution of the implementation under analysis, and the variable values and other annotations corresponding to the reference implementation, is also displayed. Verification output 136 shows the rule or variable value identifiers 164, and also corresponding messages 168. It can be seen that monitoring system 130 found all of the required values 164 (the value v, the value prod, and the value w) in the running memory 146 during execution of the implementation under analysis 270. Therefore, it can be seen that the implementation under analysis matches, or corresponds to, the reference implementation.

Returning to FIG. 5, assume, at block 254, that the implementation under analysis does not match any of the reference implementations (either because it is missing a required variable value, or does not meet conditions set by a more complex rule, etc.), then verification output generator 160 generates an output indicating that the implementation under analysis does not match any of the reference implementations and the reasons why. This is indicated by block 256. The verification output 136 is then surfaced, along with the implementation under analysis, for user interaction. This is indicated by block 258 in the flow diagram of FIG. 5. An example of processing an implementation that does not match the reference implementation may be helpful as well.

FIG. 8 shows an example of a second implementation under analysis 280. It can be seen that implementation under analysis 280 does match the reference implementation 188. Therefore, when implementation under analysis 280 is loaded into execution system 128 and executed, the deep memory copy of running memory 146 will not contain the same variable values as are generated by, and expected by, reference implementation 182.

Figure 9:
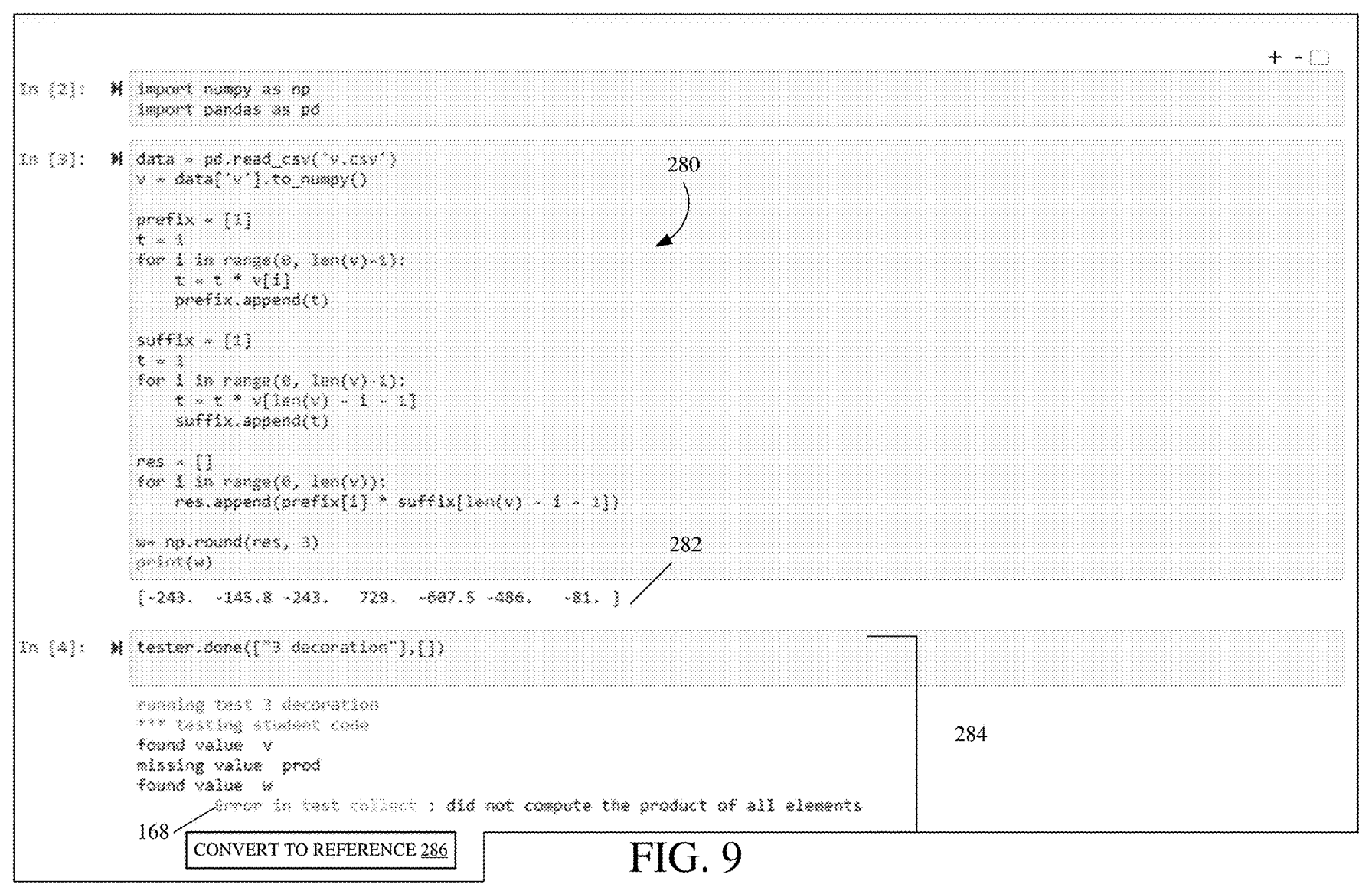

FIG. 9 shows an output that can be generated that illustrates the result 282 of running implementation under analysis 280, as well as the verification output 284 generated by verification output generator 160. Verification output 284 shows why the implementation under analysis 280 does not match the reference implementation 188. Output 284 shows that the variable values v and w were found in the running memory during execution of implementation 280, but the prod value was not found. Thus, a message 168 that explains why the implementation 280 does not match the reference implementation 188, is also displayed. It reads "Error in text collect: did not compute the product of all elements".

FIG. 9 also shows, however, that implementation 280 produced the correct result 282. It can be seen that result 282 matches result 272 that was generated by implementation 270 which, in turn, matches the result generated by the reference implementation 188. Therefore, in an academic scenario, implementation 280 would be a correct implementation even though it did not match the reference implementation 188 generated by the professor. In that case, verification output generator 160 may also generate a user input mechanism 286 that can be actuated in order to allow user 114 (e.g., the professor) to annotate implementation 280 and convert it into another reference implementation. That way, if subsequent implementations are input for analysis (e.g., by other students), they can be compared against both the original reference implementation 188, and a newly created reference implementation 280 to determine whether the newly submitted implementation under analysis matches either of the reference implementations. Having verification output generator 160 generate the verification output with a user input mechanism 286 that can be actuated to convert the implementation under analysis to another reference implementation is indicated by block 261 in the flow diagram of FIG. 5. The verification output can be surfaced in other ways, and with other actuators as well, and this is indicated by block 263.

It will also be noted that, even if implementation 280 was not a correct implementation (meaning that it did not match any reference implementation), user 114 could still actuate actuator 286 and convert it to a negative reference implementation. For example, in the academic scenario, assume that multiple students have submitted the same incorrect implementation. In that case, user 114 (e.g., the professor) may covert that incorrect implementation into a reference implementation and provide additional feedback comments which will be surfaced for students who submit it. The additional feedback comments may provide a higher level of detail describing why this particular implementation is incorrect, what went wrong, what needs to be corrected, what errors the student made in coding or otherwise implementing her or his code, etc.

Assuming that user 114 wishes to make implementation 280 into a reference implementation, user 114 actuates actuator 286. Detecting user actuation is indicated by block 288 in the flow diagram of FIG. 5. This initiates a conversion of implementation 280 into another reference implementation. Actuating the convert to reference actuator 286 is also indicated by block 290 in the flow diagram of FIG. 5. It will be appreciated that user 114 can interact with the verification output in other ways as well, and this is indicated by block 292.

Based on the detected user interactions with verification output 136, system 102 can perform actions accordingly. This is indicated by block 293. By way of example, reference conversion system 132 can detect that user 114 has actuated actuator 286 indicating that user 114 wishes to convert implementation 280 into a reference implementation. Under such conditions, reference conversion system 132 can import the implementation 280 into test point configuration system 140. Component 139 then surfaces an interface that allows user 114 to configure the test points in implementation 280 in order to convert it into a reference implementation. This is indicated by block 294 in the flow diagram of FIG. 5. Other actions can be performed as well, as indicated by block 296.

Figure 10:
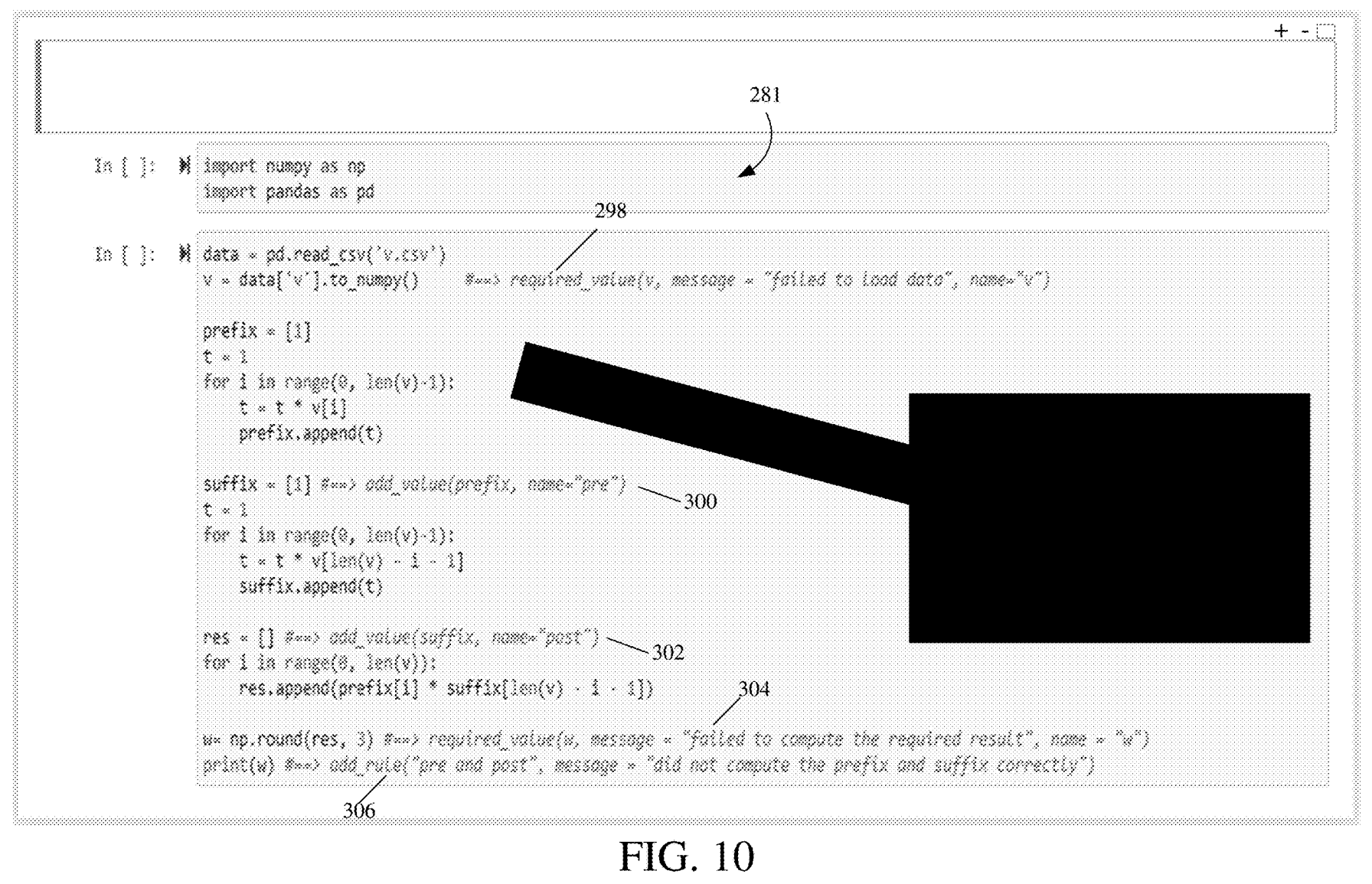

FIG. 10 shows an example in which implementation 280 has been annotated, or decorated, to convert it to a reference implementation 281. Annotation 298 indicates that a vector is expected, that has a required vector value v. Annotations 300 and 302 add additional expected values for a prefix value and a suffix value. Annotation 304 indicates that, in order to correspond to reference implementation 280, an implementation under analysis must produce the same result.

Annotation 306 adds a rule that has more complexity than simply specifying a required variable value. Annotation 306 adds a rule with a logical AND operator that indicates that both the prefix and suffix must be calculated properly as well.

Once configuration of implementation 281 is complete, test point configuration system 140 illustratively stores it as another reference implementation in data store 120, against which implementations under analysis can be compared.

Figure 11:
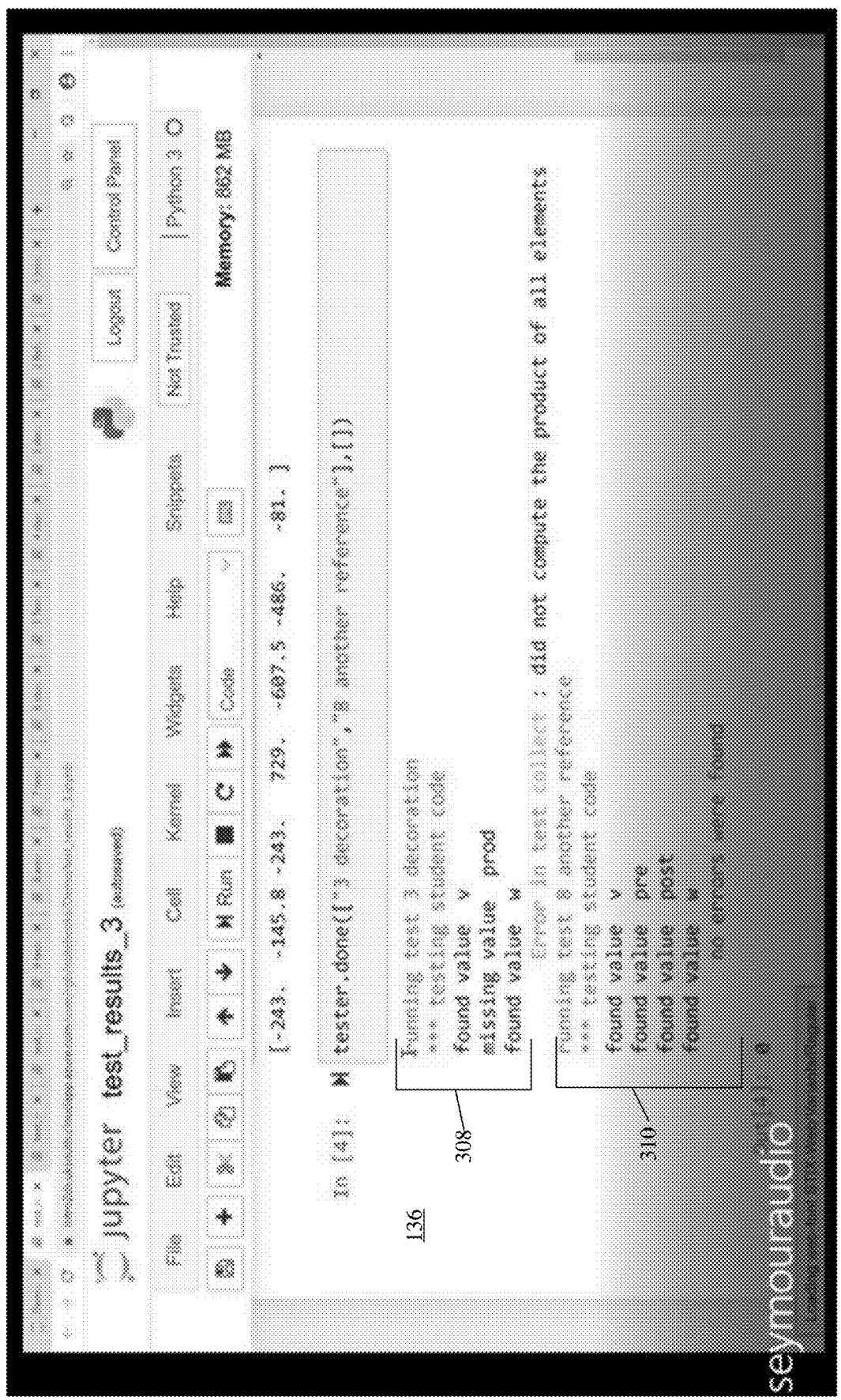
FIG. 11 shows an output that is generated based on monitoring or tracing the software implementation illustrated in FIG. 8, once it has been configured as a reference implementation.

In one example, an implementation under analysis can be compared against multiple reference implementations by monitoring system 130. In such an example, system 130 generates a verification output 136 that shows the results of the comparison of an implementation under analysis to each of the multiple different reference implementations. FIG. 11 shows one example of this.

FIG. 11 assumes that the implementation 280 has now been resubmitted to system 102 as an implementation under analysis. It will be recalled that both implementation 280 and implementation 182 have been added as reference implementations 281 and 188. Therefore, when implementation 280 is executed by execution system 128, monitoring system 130 traces the memory map of running memory 146 and compares the values in running memory 146 against the values corresponding to each of the different reference implementations 188 and 281.

FIG. 11 shows that verification output generator 160 has generated a verification output 136 that has two portions. The first portion 308 identifies the results of comparing the memory map generated by implementation 280 against the reference implementation 188. It can be seen that, while implementation 280 reads in the proper vector and finds the proper result, it does not calculate an expected product, that is expected by reference implementation 188. Thus, the output portion 308 indicates that implementation 280 does not match reference implementation 188, and why the two do not match.

However, the output portion 310 shows the results of comparing the memory map generated by implementation 280 against that generated by reference implementation 281 that has been stored in data store 120 as a reference implementation. It can be seen in FIG. 11 that the memory map corresponding to the execution of implementation 280 has all of the required values that are required by reference implementation 281. In other words, the variable value for the input vector was found, the values for the prefix and suffix were both found, and the value of the output was also found. Thus, system 158 can identify that the implementation under analysis 280 matches the reference implementation 281. Output portion 310 shows this, and why the two match.

It can thus be seen that a reference implementation is surfaced for easy annotation by a user to select which portions of the reference implementation are important in identifying matching implementations. The memory map of an implementation under analysis is traced and compared to the memory map generated by the reference implementation to determine whether the two implementations are the same. The reference implementations can be positive or negative implementations meaning that the implementation under analysis either matches what is expected or matches something that is not expected. The present description describes identifying the variable values in the running memory, instead of the variable names, themselves. Thus, even if source code has been modified (such as by changing variable names or changing the order in which steps are performed), it can still be identified as corresponding to a reference implementation, so long as the expected values of the variables are found in the running memory generated during execution of the implementation under analysis. The present description also describes a way in which implementations under analysis can easily be surfaced for user annotation and converted to additional reference implementations.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 12:
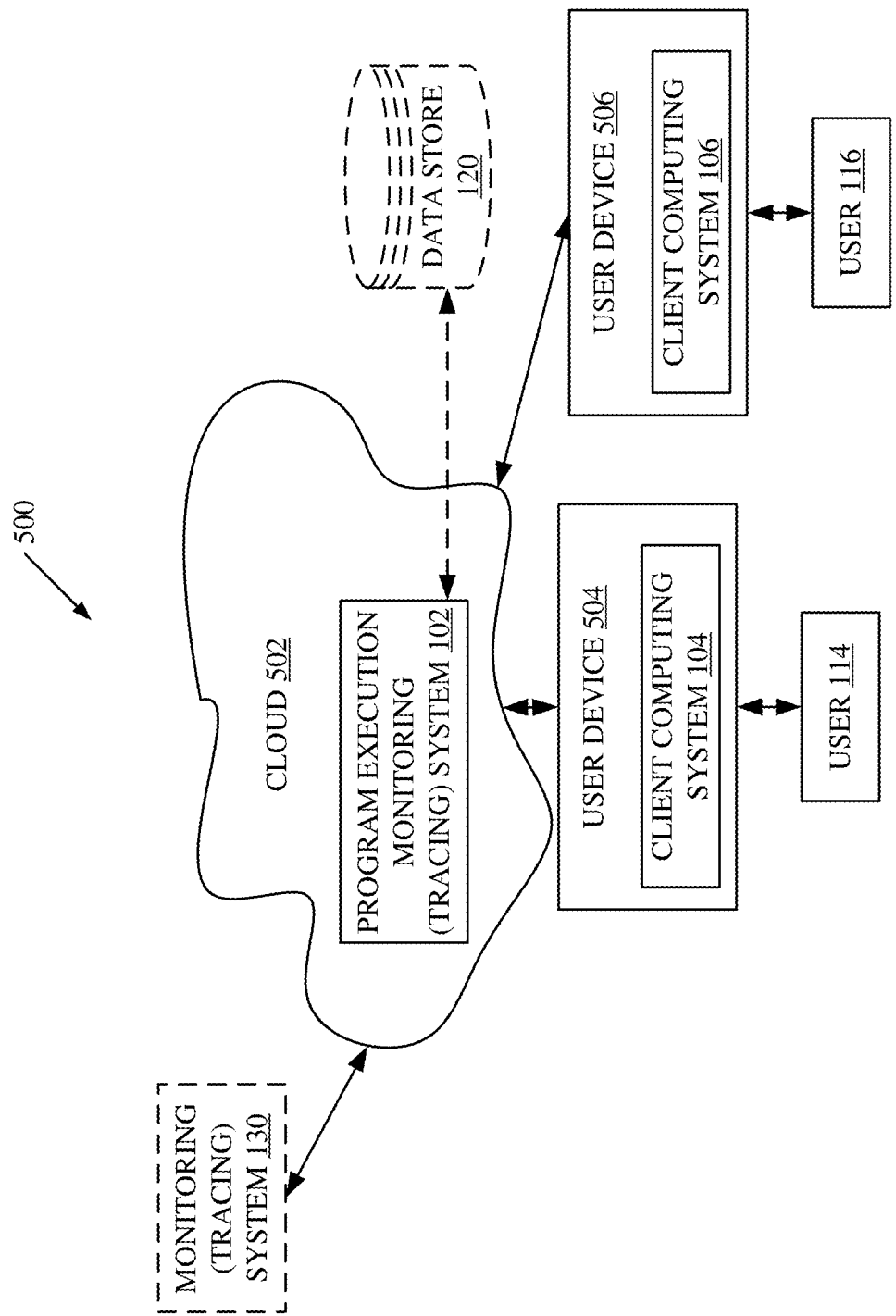
FIG. 12 shows one example of the computing system architecture illustrated in FIG. 1, deployed in a cloud computing architecture.

FIG. 12 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various examples, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 12, some items are similar to those shown in FIG. 1 and they are similarly numbered. FIG. 12 specifically shows that program execution monitoring (tracing) system 102 can be located in cloud 502 (which can be public, private, or a combination where portions are public while others are private). Therefore, users 114 and 116 use user devices 504 and 506 to access those systems through cloud 502.

FIG. 12 also depicts another example of a cloud architecture. FIG. 12 shows that it is also contemplated that some elements of computing system 102 can be disposed in cloud 502 while others are not. By way of example, data store 120 can be disposed outside of cloud 502, and accessed through cloud 502. In another example, monitoring (tracing) system 130 (or other items) can be outside of cloud 502. Regardless of where they are located, they can be accessed directly by devices 504, 506, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
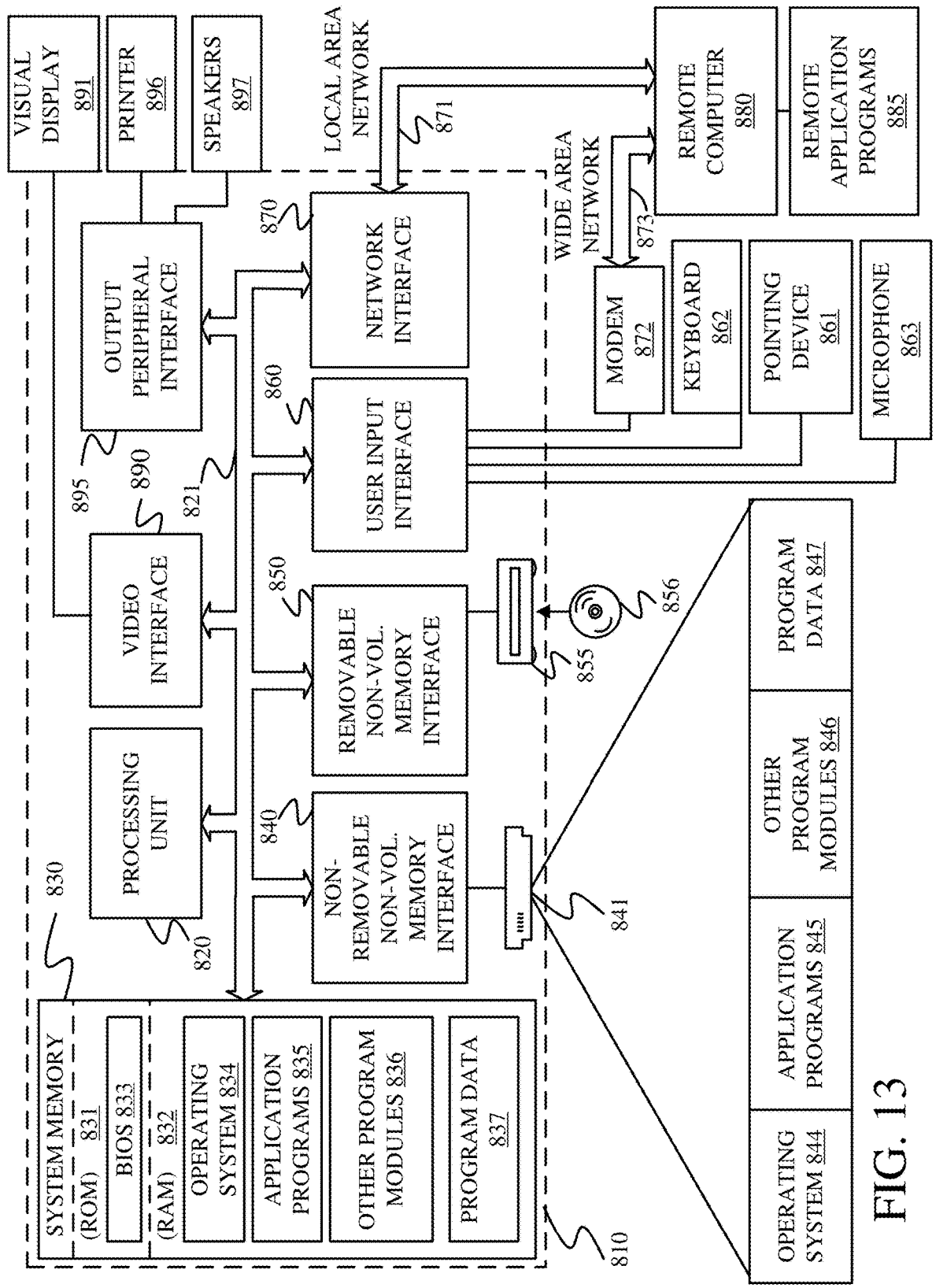
FIG. 13 is a block diagram showing one example of a computing environment that can be used in the architectures shown in the previous figures.

FIG. 13 is one example of a computing environment in which architecture 100, or parts of it, (for example) can be deployed. With reference to FIG. 13, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:

a test point configuration system that displays a reference software implementation for user annotation and detects a user input annotating a portion of the reference software implementation as a variable value to be monitored;

an execution system that executes the reference software implementation and that executes a software implementation under analysis;

a tracing system that traces the variable value to be monitored in a running memory used by the reference software implementation during execution to obtain an expected variable value and that traces a running memory, used by the software implementation under analysis, during execution of the software implementation under analysis;

a rule application system that generates a comparison result indicative of whether the expected variable value appears in the copy of the running memory used by the software implementation under analysis; and a verification output generator that generates a verification output indicative of whether the software implementation under analysis corresponds to the reference software implementation, based on the comparison result, the verification output including a message indicative of whether the expected variable value appears in the running memory used by the software implementation under analysis.

Example 2 is the computer system of any or all previous examples wherein the tracing system comprises:

a variable value tracing system configured to copy the running memory used by the reference software implementation during execution of the reference software implementation.

Example 3 is the computer system of any or all previous examples wherein the test point configuration system comprises:

a rule generation and annotation component configured to detect a user input identifying a rule that applies a logical operator to one or more variable values generated in the running memory used by the reference software implementation during execution of the reference software implementation and to annotate the reference software implementation with the rule.

Example 4 is the computer system of any or all previous examples wherein the tracing system is configured to trace the one or more variable values in the running memory used by the reference software application during execution of the reference software implementation to obtain an expected rule result.

Example 5 is the computer system of any or all previous examples wherein the rule application system is configured to apply the rule to variable values in the running memory used by the software implementation under analysis to obtain a rule result under analysis, and generate a comparison result indicative of whether the expected rule result matches the rule result under analysis.

Example 6 is the computer system of any or all previous examples wherein the rule application system is configured to identify an additional reference software implementation against which the software implementation under analysis is to be compared, and access an additional expected variable value corresponding to the additional reference software implementation.

Example 7 is the computer system of any or all previous examples wherein the rule application system is further configured to generate an additional comparison result indicative of whether the additional expected variable value appears in the copy of the running memory used by the software implementation under analysis, and generate an output indicative of whether the software implementation under analysis corresponds to the additional reference software implementation, based on the additional comparison result, along with a message indicative of whether the additional expected variable value appears in the copy of the running memory used by the software implementation under analysis.

Example 8 is the computer system of any or all previous examples wherein the verification output generator is configured to, determine whether the software implementation under analysis corresponds to the reference software implementation, based on the comparison result, and, if not, then displaying a conversion user input mechanism that is actuated to convert the software implementation under analysis to an additional reference software implementation.

Example 9 is the computer system of any or all previous examples and further comprising:

a reference conversion system configured to detect user actuation of the conversion user input mechanism, and display the software implementation under analysis for user annotation to identify a portion of the software implementation under analysis as an additional variable value to be monitored, to obtain an additional reference software implementation.

Example 10 the computer system of any or all previous examples wherein the reference conversion system is configured to detect user annotation of the software implementation under analysis, and save the additional reference software implementation for comparison against an additional software implementation under analysis.

Example 11 is a computer implemented method, comprising:

displaying a reference software implementation for user annotation;

detecting a user input annotating a portion of the reference software implementation as a variable value to be monitored;

executing the reference software implementation;

tracing the variable value to be monitored in a running memory used by the reference software implementation, during execution of the reference software implementation, to obtain an expected variable value;

executing a software implementation under analysis;

copying a running memory, used by the software implementation under analysis, during execution of the software implementation under analysis;

generating a comparison result indicative of whether the expected variable value appears in the copy of the running memory used by the software implementation under analysis; and generating an output indicative of whether the software implementation under analysis corresponds to the reference software implementation, based on the comparison result, along with a message indicative of whether the expected variable value appears in the copy of the running memory used by the software implementation under analysis.

Example 12 is the computer implemented method of any or all previous examples wherein tracing comprises:

copying the running memory used by the reference software implementation during execution of the reference software implementation.

Example 13 is the computer implemented method of any or all previous examples and further comprising:

detecting a user input identifying a rule that applies a logical operator to one or more variable values generated in the running memory used by the reference software implementation during execution of the reference software implementation; and annotating the reference software implementation with the rule.

Example 14 is the computer implemented method of any or all previous examples and further comprising:

tracing the one or more variable values in the running memory used by the reference software application during execution of the reference software implementation to obtain an expected rule result.

Example 15 is the computer implemented method of any or all previous examples wherein generating the comparison result comprises:

applying the rule to variable values in the running memory used by the software implementation under analysis to obtain a rule result under analysis; and generating a comparison result indicative of whether the expected rule result matches the rule result under analysis.

Example 16 is the computer implemented method of any or all previous examples wherein generating a comparison result comprises:

identifying an additional reference software implementation against which the software implementation under analysis is to be compared; and accessing an additional expected variable value corresponding to the additional reference software implementation.

Example 17 is the computer implemented method of any or all previous examples and further comprising:

generating an additional comparison result indicative of whether the additional expected variable value appears in the copy of the running memory used by the software implementation under analysis; and generating an output indicative of whether the software implementation under analysis corresponds to the additional reference software implementation, based on the additional comparison result, along with a message indicative of whether the additional expected variable value appears in the copy of the running memory used by the software implementation under analysis.

Example 18 is the computer implemented method of any or all previous examples wherein generating an output comprises:

if the software implementation under analysis does not correspond to the reference software implementation, based on the comparison result, then displaying a conversion user input mechanism that is actuated to convert the software implementation under analysis to an additional reference software implementation.

Example 19 is the computer implemented method of any or all previous examples and further comprising:

detecting user actuation of the conversion user input mechanism;

displaying the software implementation under analysis for user annotation to identify a portion of the software implementation under analysis as an additional variable value to be monitored, to obtain an additional reference software implementation;

detecting user annotation of the software implementation under analysis; and saving the additional reference software implementation for comparison against an additional software implementation under analysis.

Example 20 is a computer system, comprising:

a test point configuration system that displays a reference software implementation for user annotation and detects a user input annotating a portion of the reference software implementation as a variable value to be monitored;

a rule generation and annotation component configured to detect a user input identifying a rule that applies a logical operator to one or more variable values generated in the running memory used by the reference software implementation during execution of the reference software implementation and to annotate the reference software implementation with the rule;

an execution system that executes the reference software implementation and that executes a software implementation under analysis;

a tracing system that copies the running memory used by the reference software implementation during execution of the reference software implementation to obtain an expected variable value and that traces a running memory, used by the software implementation under analysis, during execution of the software implementation under analysis;

a rule application system that generates a comparison result indicative of whether the expected variable value appears in the copy of the running memory used by the software implementation under analysis; and a verification output generator that generates a verification output indicative of whether the software implementation under analysis corresponds to the reference software implementation, based on the comparison result, the verification output including a message indicative of whether the expected variable value appears in the running memory used by the software implementation under analysis.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:

at least one processor; and memory storing instructions executable by the at least one processor, wherein the instructions, when executed, cause the computer system to:

display a reference software implementation for user annotation;

detect a user input annotating a portion of the reference software implementation as a variable value to be monitored;

execute the reference software implementation;

obtain an expected variable value based on tracing the variable value to be monitored in a running memory used by the reference software implementation during execution of the reference software implementation;

trace a running memory, used by a software implementation under analysis, during execution of the software implementation under analysis;

generate a comparison result indicative of whether the expected variable value appears in a copy of the running memory used by the software implementation under analysis; and generate a verification output indicative of whether the software implementation under analysis corresponds to the reference software implementation, based on the comparison result, the verification output including a message indicative of whether the expected variable value appears in the running memory used by the software implementation under analysis.

2. The computer system of claim 1 wherein the instructions, when executed, cause the computer system to:
copy the running memory used by the reference software implementation during execution of the reference software implementation.

3. The computer system of claim 1 wherein the instructions, when executed, cause the computer system to:
detect a user input identifying a rule that applies a logical operator to one or more variable values generated in the running memory used by the reference software implementation during execution of the reference software implementation and to annotate the reference software implementation with the rule.

4. The computer system of claim 3 wherein the instructions, when executed, cause the computer system to:
trace the one or more variable values in the running memory used by the reference software application during execution of the reference software implementation to obtain an expected rule result; and
apply the rule to variable values in the running memory used by the software implementation under analysis to obtain a rule result under analysis, and generate a comparison result indicative of whether the expected rule result matches the rule result under analysis.

5. The computer system of claim 1 wherein the instructions, when executed, cause the computer system to:
define the variable value as an input vector based on the user input; and
generate the comparison result indicative of whether the input vector appears in the copy of the running memory used by the software implementation under analysis.

6. The computer system of claim 5 wherein the variable value to be monitored comprises a set of variable values, including an initial value, an intermediate value, and a final value.

7. The computer system of claim 1 wherein the instructions, when executed, cause the computer system to:
identify an additional reference software implementation against which the software implementation under analysis is to be compared, and access an additional expected variable value corresponding to the additional reference software implementation; and
generate an additional comparison result indicative of whether the additional expected variable value appears in the copy of the running memory used by the software implementation under analysis, and generate an output indicative of whether the software implementation under analysis corresponds to the additional reference software implementation, based on the additional comparison result, along with a message indicative of whether the additional expected variable value appears in the copy of the running memory used by the software implementation under analysis.

8. The computer system of claim 1 wherein the instructions, when executed, cause the computer system to, determine whether the software implementation under analysis corresponds to the reference software implementation, based on the comparison result, and, if not, then display a conversion user input mechanism that is actuated to convert the software implementation under analysis to an additional reference software implementation.

9. The computer system of claim 8 wherein the instructions, when executed, cause the computer system to:
detect user actuation of the conversion user input mechanism, and display the software implementation under analysis for user annotation to identify a portion of the software implementation under analysis as an additional variable value to be monitored, to obtain an additional reference software implementation; and
detect user annotation of the software implementation under analysis, and save the additional reference software implementation for comparison against an additional software implementation under analysis.

10. The computer system of claim 1 wherein the instructions, when executed, cause the computer system to:
detect a change in the variable value in the software implementation under analysis;
based on the change in the variable value, obtain a copy of the running memory used by the software implementation under analysis; and
generate the comparison result based on the obtained copy of the running memory.

11. A computer implemented method, comprising:
displaying a reference software implementation for user annotation;
detecting a user input annotating a portion of the reference software implementation as a variable value to be monitored;
executing the reference software implementation;
tracing the variable value to be monitored in a running memory used by the reference software implementation, during execution of the reference software implementation, to obtain an expected variable value;
executing a software implementation under analysis;
copying a running memory, used by the software implementation under analysis, during execution of the software implementation under analysis;
generating a comparison result indicative of whether the expected variable value appears in the copy of the running memory used by the software implementation under analysis; and
generating an output indicative of whether the software implementation under analysis corresponds to the reference software implementation, based on the comparison result, along with a message indicative of whether the expected variable value appears in the copy of the running memory used by the software implementation under analysis.

12. The computer implemented method of claim 11 wherein tracing comprises:
copying the running memory used by the reference software implementation during execution of the reference software implementation.

13. The computer implemented method of claim 11 and further comprising:
detecting a user input identifying a rule that applies a logical operator to one or more variable values generated in the running memory used by the reference software implementation during execution of the reference software implementation; and
annotating the reference software implementation with the rule.

14. The computer implemented method of claim 13 and further comprising:
tracing the one or more variable values in the running memory used by the reference software application during execution of the reference software implementation to obtain an expected rule result.

15. The computer implemented method of claim 14 wherein generating the comparison result comprises:
applying the rule to variable values in the running memory used by the software implementation under analysis to obtain a rule result under analysis; and
generating a comparison result indicative of whether the expected rule result matches the rule result under analysis.

16. The computer implemented method of claim 11 wherein generating a comparison result comprises:
identifying an additional reference software implementation against which the software implementation under analysis is to be compared; and
accessing an additional expected variable value corresponding to the additional reference software implementation.

17. The computer implemented method of claim 16 and further comprising:
generating an additional comparison result indicative of whether the additional expected variable value appears in the copy of the running memory used by the software implementation under analysis; and
generating an output indicative of whether the software implementation under analysis corresponds to the additional reference software implementation, based on the additional comparison result, along with a message indicative of whether the additional expected variable value appears in the copy of the running memory used by the software implementation under analysis.

18. The computer implemented method of claim 11 wherein generating an output comprises:
if the software implementation under analysis does not correspond to the reference software implementation, based on the comparison result, then displaying a conversion user input mechanism that is actuated to convert the software implementation under analysis to an additional reference software implementation.

19. The computer implemented method of claim 18 and further comprising:
detecting user actuation of the conversion user input mechanism;
displaying the software implementation under analysis for user annotation to identify a portion of the software implementation under analysis as an additional variable value to be monitored, to obtain an additional reference software implementation;
detecting user annotation of the software implementation under analysis; and
saving the additional reference software implementation for comparison against an additional software implementation under analysis.

20. A computer system, comprising:
a test point configuration system that displays a reference software implementation for user annotation and detects a user input annotating a portion of the reference software implementation as a variable value to be monitored;
a rule generation and annotation component configured to detect a user input identifying a rule that applies a logical operator to one or more variable values generated in the running memory used by the reference software implementation during execution of the reference software implementation and to annotate the reference software implementation with the rule;
an execution system that executes the reference software implementation and that executes a software implementation under analysis;
a tracing system that copies the running memory used by the reference software implementation during execution of the reference software implementation to obtain an expected variable value and that traces a running memory, used by the software implementation under analysis, during execution of the software implementation under analysis;
a rule application system that generates a comparison result indicative of whether the expected variable value appears in the copy of the running memory used by the software implementation under analysis; and
a verification output generator that generates a verification output indicative of whether the software implementation under analysis corresponds to the reference software implementation, based on the comparison result, the verification output including a message indicative of whether the expected variable value appears in the running memory used by the software implementation under analysis.

* * * * *